United States Patent [19]

Hashimoto et al.

[11] Patent Number: 5,093,402
[45] Date of Patent: Mar. 3, 1992

[54] SOLID GOLF BALLS REINFORCED WITH METAL SALTS OF $\alpha,\beta$-ETHYLENICALLY UNSATURATED CARBOXYLIC ACIDS VIA SOLUTION MASTERBATCH

[75] Inventors: Takatsugu Hashimoto, Tokyo; Yoshinori Egashira, Iruma; Takeshi Kinoshita, Tokorozawa City, all of Japan

[73] Assignee: Bridgestone Corporation, Tokyo, Japan

[21] Appl. No.: 647,079

[22] Filed: Jan. 29, 1991

[51] Int. Cl.$^5$ .............................................. C08K 5/09
[52] U.S. Cl. .................................... 524/398; 524/399; 524/400; 524/908; 273/62; 156/146
[58] Field of Search ............... 524/398, 399, 400, 908; 273/62; 156/146

[56] References Cited

U.S. PATENT DOCUMENTS

| | | | |
|---|---|---|---|
| 3,823,122 | 7/1974 | Schuh et al. | 260/85.1 |
| 4,056,269 | 11/1977 | Pollitt et al. | 273/218 |
| 4,065,537 | 12/1977 | Miller et al. | 264/143 |
| 4,082,288 | 4/1978 | Martin et al. | 273/218 |
| 4,100,182 | 7/1978 | Martin et al. | 260/429.9 |
| 4,141,559 | 2/1979 | Melvia et al. | 273/220 |
| 4,191,671 | 3/1980 | Kataoka et al. | 260/23.7 |
| 4,192,790 | 3/1980 | McKinstry et al. | 260/31.2 |
| 4,226,590 | 2/1988 | Molitor | 525/123 |
| 4,266,772 | 5/1981 | Martin et al. | 273/218 |
| 4,495,326 | 1/1985 | Donatelli et al. | 524/533 |
| 4,500,466 | 2/1985 | Hayes et al. | 260/429.9 |
| 4,501,866 | 2/1985 | Roggeman et al. | 526/133 |
| 4,529,770 | 7/1985 | Hayes et al. | 524/445 |
| 4,546,980 | 10/1985 | Gendreau et al. | 524/908 |
| 4,616,048 | 10/1986 | DeTrano et al. | 523/166 |
| 4,688,801 | 8/1987 | Reiter | 273/218 |
| 4,713,409 | 12/1987 | Hayes et al. | 524/518 |
| 4,715,607 | 12/1987 | Llort et al. | 524/908 |
| 4,720,526 | 1/1988 | Roland et al. | 525/273 |
| 4,770,422 | 9/1988 | Isaac | 273/218 |
| 4,929,678 | 5/1990 | Hamada et al. | 525/193 |
| 4,955,613 | 9/1990 | Gendreau et al. | 525/236 |
| 4,971,329 | 11/1990 | Llort et al. | 525/236 |
| 4,974,852 | 12/1990 | Hiraoka et al. | 273/218 |
| 4,990,570 | 2/1991 | Saito et al. | 525/254 |

FOREIGN PATENT DOCUMENTS 63-223048 9/1988 Japan.

*Primary Examiner*—Paul R. Michl
*Assistant Examiner*—Peter Szekely
*Attorney, Agent, or Firm*—Frank J. Troy, Sr.

[57] ABSTRACT

Solid golf balls are produced by the method comprising the steps of preparing a polymer cement in a suitable organic solvent, forming a suspension of the metal salt of an $\alpha,\beta$-ethylenically unsaturated carboxylic acid in a suitable aliphatic hydrocarbon solvent miscible with the organic solvent, mixing the polymer cement and the suspension together, removing the solvents to provide the metal salt uniformly dispersed within the polymer, and thereafter manufacturing a solid golf ball therefrom. Solid golf balls comprise a vulcanizable rubber and from about 5 to 100 parts by weight of a reinforcing filler comprising a metal salt of an $\alpha,\beta$-ethylenically unsaturated carboxylic acid, per 100 parts of the vulcanizable rubber. When the metal salts are incorporated via solution masterbatching, the resulting golf balls have improved physical properties.

14 Claims, No Drawings

SOLID GOLF BALLS REINFORCED WITH METAL SALTS OF α,β-ETHYLENICALLY UNSATURATED CARBOXYLIC ACIDS VIA SOLUTION MASTERBATCH

TECHNICAL FIELD

The present invention provides solid golf balls utilizing metal salts of α,β-ethylenically unsaturated carboxylic acids as a reinforcement. Such metal salts have been added to rubber compositions heretofore in order to improve certain physical properties of the rubber such as tensile strength and modulus. Nonetheless, because it is difficult, if not impossible, to obtain a good dispersion of the salts within the rubber during compounding, optimum improvements in cured physical properties have not been obtained. A solution masterbatch of the metal salt is employed to incorporate the metal salts.

BACKGROUND OF THE INVENTION

The use of various organic acid metal salts as a reinforcing filler in golf balls is well known and has been described in numerous patents. Rubber compounds containing these salts exhibit high hardness and good rebound. One particularly useful salt is zinc dimethacrylate which is prepared from methacrylic acid. The salt has been conventionally added to the rubber during compounding.

Processes are also known for preparing the salt in situ during mixing with the rubber compound; however, there are many disadvantages. For instance, processability is not good because methacrylic acid is a liquid and it is corrosive, requiring the use of special equipment. Also, it is necessary to remove water, produced as a by-product; long mixing times are required; curing times are longer and, the properties of the compounds are variable because reaction control is difficult in situ.

With respect to the patent literature, U.S. Pat. No. 4,082,288, for instance, relates to the preparation of basic zinc methacrylate by milling under agitation methacrylic acid with a suspension of zinc oxide in a liquid medium such as water or a volatile organic liquid.

U.S. Pat. No. 4,100,182 relates to a method for preparing an adjuvant for an elastomeric composition which involves mixing methacrylic acid with zinc oxide in a liquid medium in the proportions required to form basic zinc methacrylate, removing the liquid medium and finely dividing the resulting reaction product. The reference teaches that the liquid medium may be water or a volatile organic liquid such as a hydrocarbon liquid or an alkanol.

U.S. Pat. No. 4,191,671 is directed toward abrasion resistant rubber compositions having improved flexing fatigue resistance which are prepared by heating and curing a mixture comprising a diene elastomer, an unpolymerizable carboxylic acid or metal salt thereof, an α,β-ethylenically unsaturated carboxylic acid, a divalent metal compound and an organic peroxide.

In U.S. Pat. No. 4,500,466, owned by the Assignee of record herein, a method is provided for the preparation of zinc methacrylate powder involving the reaction of zinc oxide and methacrylic acid in a liquid aliphatic hydrocarbon such as hexane.

U.S. Pat. No. 4,501,866 provides a continuous polymerization process for preparing high cis-1,4-polybutadiene including the steps of continuously feeding 1,3-butadiene in a hydrocarbon solvent to a reaction with a preformed π allyl catalyst formed by mixing a carboxylated metal oxy borate compound with nickel or cobalt, an organoaluminum compound, an alcohol, a small amount of 1,3-butadiene and a hydrocarbon solvent and, a co-catalyst comprising a boron trifluoride complex with an alcohol.

U.S. Pat. No. 4,720,526 is directed toward a method of preparing cured rubber compositions having improved modulus properties. The method includes the steps of adding a metal methacrylate and a peroxide curing agent to a rubbery polymer and then curing the mixture.

Finally, Japanese Patent No. 63-223048 is directed toward a process which involves mixing rubber, a metal oxide, hydroxide or carbonate, acrylic acid and a solvent for the rubber. In this manner a rubber crosslinking agent, e.g., zinc diacrylate, is formed that is free from dust. Improved physical properties are imparted to the rubber products.

Despite the existence of metal salts of carboxylic acids and their widespread use in rubber polymer compounds for a variety of products including golf balls, the art has not provided a satisfactory method heretofore, for the uniform distribution of the metal salt throughout the polymer. Solid golf balls reinforced thereby have superior physical properties.

DISCLOSURE OF THE INVENTION

It is, therefore, an object of the present invention to provide solid golf balls containing reinforcing fillers comprising metal salts of α,β-ethylenically unsaturated carboxylic acids incorporated via solution masterbatch.

It is another object of the present invention to provide solid golf balls having improved physical properties.

It is another object of the present invention to provide solid golf balls from vulcanizable rubber compounds having improved processability and that have faster cure times.

It is another object of the present invention to provide a method for the uniform incorporation of metal salts of α,β-ethylenically unsaturated carboxylic acids into rubbery polymers via solution masterbatch.

In general, solid golf balls are produced by the method comprising the steps of preparing a polymer cement in a suitable aliphatic hydrocarbon solvent, forming a suspension of the metal salt of an α,β-ethylenically unsaturated carboxylic acid in a aliphatic hydrocarbon solvent miscible with the hydrocarbon solvent, mixing the cement and the suspension together and thereafter removing the solvents to provide the metal salt uniformly dispersed within the polymer, and thereafter manufacturing the solid golf balls therefrom.

The present invention also provides solid golf balls which comprise a vulcanizable rubber and from about 5 to 100 parts by weight of a reinforcing filler comprising a metal salt of an α,β-ethylenically unsaturated carboxylic acid, per 100 parts of rubber, incorporated via solution masterbatching.

These and other objects of the present invention together with the advantages thereof over existing metal salts, which shall become apparent from the specification which follows, are accomplished by the invention as hereinafter described and claimed.

PREFERRED EMBODIMENT FOR CARRYING OUT THE INVENTION

The present invention is directed toward solid golf balls exhibiting superior performance such as greater hardness and higher velocity. These and other advantages are obtained by employing a metal salt of an $\alpha,\beta$-ethylenically unsaturated carboxylic acid, such as zinc dimethacrylate, which is incorporated into the rubber via solution masterbatch.

It has also been observed that processability by dry mixing of the metal salt powder with the rubber compound is better than the in situ method in which zinc oxide and methacrylic acid are mixed directly into the polymer where they react to form the zinc dimethacrylate salt. As noted hereinabove, the known technique of incorporating metal salts of $\alpha,\beta$-ethylenically unsaturated carboxylic acids into rubber by dry mixing of the metal salts with rubber, does not provide a very uniform dispersion of the salt throughout the rubber. An alternate in situ method, involving the addition of methacrylic acid and zinc oxide, has poor processability because the methacrylic acid is a liquid and is corrosive requiring special equipment, and control is difficult leading to variable properties. The method of the present invention overcomes these disadvantages by employing a solution masterbatching technique in which a polymer cement is mixed with a compatible suspension of the metal carboxylic acid salt.

Rubbers or rubbery polymers with which the metal salts of the present invention can be reinforced for the manufacture of golf balls include natural rubber, ethylene propylene rubber (EPR), ethylene propylene diene rubber (EPDM), nitrile rubber, neoprene, diene rubbers, copolymers of a conjugated diene and at least one monoolefin and blends thereof. The copolymers of conjugated dienes may be derived from conjugated dienes such as 1,3-butadiene, 2-methyl-1,3-butadiene(isoprene), 2,3-dimethyl-1,3-butadiene, 1,3-pentadiene, 1,3-hexadiene and the like, as well as mixtures of the foregoing dienes. The preferred conjugated diene is 1,3-butadiene and the preferred rubber polymer is high cis polybutadiene and/or natural rubber.

The copolymers may be derived from various monoolefinic monomers including vinyl aromatic monomers such as styrene, alpha-methyl styrene, vinyl naphthalene, vinyl pyridine and the like; alkyl acrylates or methacrylates such as methyl acrylate, ethyl acrylate, butyl acrylate, methyl methacrylate, butyl methacrylate and the like; unsaturated nitriles such as acrylonitrile, methacrylonitrile and the like and vinyl halides such as vinyl chloride, vinylidene chloride and the like as well as mixtures of the foregoing monoolefins. The copolymers may contain up to 50 percent by weight of the monoolefin based upon the total weight of copolymer. The preferred copolymer is a copolymer of a conjugated diene, especially butadiene, and a vinyl aromatic hydrocarbon, especially styrene.

The above-described copolymers of conjugated dienes and their method of preparation are well known in the rubber and polymer arts. Many of the polymers and copolymers are commercially available.

The metal salts are derived from the reaction of a metal selected from the group consisting of zinc, iron (II) and copper (II), as well as alkaline earth metals such as magnesium and calcium and an $\alpha,\beta$-ethylenically unsaturated carboxylic acid having from about 3 to 30 carbon atoms, preferably acrylic acid or methacrylic acid. Particularly preferred is zinc dimethacrylate and magnesium dimethacrylate.

The zinc dimethacrylate and magnesium dimethacrylate may be prepared by any known method. In general, the zinc dimethacrylate may be prepared by reacting with agitation zinc oxide and methacrylic acid in an amount of from about 0.5 to about 0.6 moles of zinc oxide per mole of methacrylic acid in a liquid medium, e.g., water or a volatile organic liquid such as a liquid hydrocarbon, recovering the resulting zinc dimethacrylate product from the liquid medium and then drying the product. The magnesium dimethacrylate can be prepared in similar manner by reacting magnesium hydroxide, magnesium oxide and methacrylic acid in an amount of from about 0.5 to about 0.6 moles of magnesium hydroxide or magnesium oxide per mole of methacrylic acid in the liquid medium. If desired, the zinc dimethacrylate and magnesium dimethacrylate may be finely divided to aid in dispersing the materials into the rubber.

A preferred method for preparing the zinc dimethacrylate is described in U.S. Pat. No. 4,500,466 to Hayes et al, the disclosure of which is incorporated herein by reference. The method involves reacting with agitation zinc oxide and methacrylic acid in amounts of from about 0.5 to about 0.6 moles of zinc oxide per mole of methacrylic acid in a liquid aliphatic hydrocarbon, preferably an alkane, especially hexane, followed by recovery of the resultant zinc dimethacrylate from the liquid medium and drying thereof.

Practice of the method of the present invention for incorporating metal salts of $\alpha,\beta$-ethylenically unsaturated carboxylic acids into rubbery polymers requires that a solution of the polymer be prepared in an appropriate aliphatic hydrocarbon solvent, such as hexane, heptane and the like, to form a rubber cement. The solution contains from about 14 to 25 percent by weight of polymer, with 25 percent by weight preferred. To this solution is added a suspension of the metal carboxylic acid salt in an organic solvent, the same as or compatible with the rubber polymer solvent. The suspension contains from about 10 to 50 percent by weight of metal salt, with 30 percent by weight preferred. Thus, the metal salts are satisfactorily dispersed within the rubbery polymer without the use of processing aids such as fatty acids which are often necessary in dry mixing techniques.

The polymer cement and solution masterbatch containing the $\alpha,\beta$-ethylenically unsaturated carboxylic acid metal salt can be used immediately or stored for subsequent combination. Another advantage of the present invention is that the solvent utilized to prepare the polymer is not removed at this stage, thereby saving the time and cost otherwise expended for a separate recovery of the polymer. Conventionally, the solvent is removed from the polymer when the latter is recovered and solvent must also be removed following preparation of the metal salt e.g., zinc dimethacrylate. The two components are then combined by milling or similar technique. The method of the present invention involves the combination of two solutions, with only one solvent removal.

When desired, the solution and suspension are then stirred together vigorously for at least 30 minutes to about 100 hours at 25° to 100° C. under a nitrogen atmosphere. The solvents are then removed by one of several conventional methods, e.g., drum drying, extrusion, evaporation, air drying or the like to yield a dispersion of the metal salt in the polymer. Preferred removal of solvents is by drum drying or extrusion methods. The method can be practiced in a batch or a continuous manner, as exemplified hereinbelow.

The amount of the metal salt of the present invention that can be added to the rubber ranges generally from about 5 to 100 parts by weight, per 100 parts of rubber (phr) preferably about 10 to 70 parts by weight and most preferably about 20 to 60 parts by weight, depending somewhat upon which of the foregoing types of salt is selected. The relative amounts of rubber cement and metal salt suspension can be varied depending upon the concentration of each, and the overall desired composition of the vulcanizable rubber compound.

In order to determine the amount of the solution masterbatch to be combined with the polymer, it should be noted that the masterbatch contains some polymer. Thus, for example, assuming a solution masterbatch comprising 50 percent zinc dimethacrylate and 50 percent polymer, selecting 80 parts by weight thereof would provide 40 parts of the zinc dimethacrylate salt. By combining with 60 parts of polymer, the compound comprises 100 total parts of rubber and 40 phr of the zinc dimethacrylate salt. Of course, it is possible to use just the solution masterbatch which comprises polymer and zinc dimethacrylate; however, it is preferred to utilize the solution masterbatch and add it to rubber as presented in the examples hereinbelow.

The polymer compounds containing the metal salts of the present invention are cured with peroxides. Peroxide curing agents which may be used in the compositions include organic peroxides such as dicumyl peroxide, bis-(t-butyl peroxy) diisopropyl benzene, t-butyl perbenzoate, di-t-butyl peroxide, 2,5-dimethyl-2,5-di-t-butyl peroxide-hexane and the like. The preferred peroxide curing agents are bis-(t-butyl peroxy)-diisopropyl benzene and dicumyl peroxide.

Amounts of peroxide curing agents included in the compositions will depend upon the type of rubber utilized and may broadly be stated as cure effective amounts. In general, such amounts may range from about 0.2 to about 10 parts by weight per 100 parts by weight of rubbery polymer.

The compositions may optionally contain other additives commonly utilized in rubber compositions such as process and extender oils, antioxidants, waxes, zinc oxide, calcium carbonate, barium sulfate and the like. Additionally, fillers or mixtures of fillers can be used in amounts of from about 30 to about 70 parts by weight per 100 parts by weight of rubbery polymer.

In order to demonstrate practice of the present invention, a polymer cement was first prepared in a batch process, as Example 1, and a continuous process, as Example 2. A zinc dimethacrylate powder, prepared as in the aforementioned U.S. Pat. No. 4,500,466 was used to prepare a suspension in hexane, as Example 3. In Examples 4 and 5, the suspension of Example 3 was added to the polymer cements of Examples 1 and 2, respectively to form solution masterbatches for subsequent addition to a polymer.

EXAMPLE NO. 1

In this example, a 7.6 liter stainless steel reactor was fitted with a thermometer, stirrer, inlet and outlet port and a nitrogen atmosphere was provided. A 4536 gram blend containing 1097.7 grams of 1,3-butadiene in hexane was charged followed by a preformed catalyst. The catalyst was prepared as a two part system as follows.

Part I

Into a 828 cc crown capped beverage bottle were charged the following ingredients in sequential order.
1) 18.4 ml of tri-isobutylaluminum in hexane (18%, 11.2 mmole).
2) 85 grams of 1,3-butadiene/hexane blend containing 20 grams of monomer.
3) 0.56 grams of nickel boroacylate (NiOB) in hexane (0.09 moles).

Part II

A borotrifluoride/n-hexanol complex was formed by combining 11.2 mmoles of boron trifluoride and 22.4 mmoles of n-hexanol (2:1 ratio of n-hexanol to $BF_3$).

Parts I and II of the resultant preformed catalyst were then charged to the above reactor at room temperature. The polymerization was then allowed to proceed for 60 minutes at 90° to 100° C. The resulting polymer cement (>95 percent conversion) was then dropped into 3500 ml of hexane containing an amine stopping agent, such as one of the aliphatic diamines, and a non-staining antioxidant, such as one of the hindered phenols. Typical properties of the polymer prepared by the above batch process were as follows:

| | |
|---|---|
| ML/4/100° C. | 41.0 |
| DSV | 2.29 |
| [μ] THF | 2.59 |
| Microstructure by Infrared | |
| Cis-1,4 | 96.4% |
| Trans-1,4 | 2.40% |
| Vinyl | 1.2% |

EXAMPLE NO. 2

A polymerization was conducted in a 24.6 liter continuously stirred tank reactor under adiabatic conditions. A purified 1,3-butadiene/hexane blend containing 26 percent by weight of 1,3-butadiene was metered continuously into the reactor. The preformed catalyst components (Part I and Part II) were metered separately and continuously into the reactor. The polymerization was carried out at ≧102° C. with a 45 to 60 minute residence time. The polymer cement was collected in a separate reactor and terminated with an amine-type stopping agent, and a non-staining antioxidant was added. Five samples, 2A–2E, were prepared as reported in Table I which presents polymerization charges, conditions and properties.

TABLE I

| Continuous Polybutadiene Cement Preparation | | | | | |
|---|---|---|---|---|---|
| | Example No. | | | | |
| | 2A | 2B | 2C | 2D | 2E |
| Bd. Wt. % | 22.0 | 22.4 | 22.6 | 23.6 | 23.6 |
| NiOB,$^a$ mM phgm | 0.074 | 0.076 | 0.073 | 0.072 | 0.069 |
| Ratio of Catalyst Components | | | | | |
| Al/Ni | 11:1 | 10:1 | 9:1 | 10:1 | 9:1 |
| B/Ni | 11:1 | 10:1 | 10:1 | 10:1 | 9:1 |
| Polymerization Conditions | | | | | |
| Temp. °C., Top of Reactor | 103 | 108 | 108 | 105 | 108 |
| Residence Time (min.) | 60 | 45 | 45 | 45 | 45 |
| % Conversion | 88.2 | 88.0 | 88.2 | 89.6 | 91.3 |
| Physical Properties | | | | | |
| $ML_{1+4}$ @ 100° C. | 50.0 | 55.0 | 55.0 | 52.0 | 51.0 |

TABLE I-continued

Continuous Polybutadiene Cement Preparation

| | Example No. | | | | |
|---|---|---|---|---|---|
| | 2A | 2B | 2C | 2D | 2E |
| DSV | 2.28 | 2.36 | 2.42 | 2.34 | 2.33 |
| % Gel | 7.3 | 7.8 | 4.6 | 3.8 | 4.3 |
| Microstructure | | | | | |
| % Cis-1,4 | 95.6 | 95.8 | 95.9 | 95.8 | 95.4 |
| % Trans-1,4 | 2.8 | 2.8 | 2.8 | 2.8 | 3.2 |
| % Vinyl | 1.6 | 1.4 | 1.3 | 1.4 | 1.4 |

*Nickel boroacylate

EXAMPLE NO. 3

The preparation of the zinc methacrylate/hexane suspension was conducted in a 378 liter stainless steel reactor equipped with a thermometer, a stirrer, and an inlet and outlet port. The reactor was maintained under a nitrogen atmosphere during and after the reaction. To the above described reactor was added in sequence 82.8 liters of hexane, 15 ml each of Triton X-15, Triton X-45 and Triton X-100 surfactants, 4.5 kilograms of zinc oxide and finally, 9.2 kilograms of methacrylic acid. The Triton components are nonionic octylphenoxy polyethoxy ethanol surfactants available from Rohm & Hass Company. These reactants were all added at room temperature. Following a slight exotherm, the reaction mixture was stirred vigorously at ambient temperature for 24 hours. The resulting suspension of zinc methacrylate in hexane was used directly in the suspension masterbatch preparations which follow, Examples 4 and 5.

EXAMPLE NO. 4

To an 18.9 liter reactor fitted with a stirrer and an addition port was charged 3629 grams of the polymer cement from Example 1 (13% total solids or 472 grams of polymer). A suspension of zinc dimethacrylate in hexane (396 grams in 2000 ml of hexane) as prepared in Example 3 was then charged slowly into the polymer cement with vigorous stirring, under a nitrogen atmosphere and at room temperature over a period of 15 minutes. After addition was complete, the reaction mixture was stirred an additional 30 minutes. The resulting white viscous product containing the polymer and zinc methacrylate was checked for average particle size using a "fineness of grind gauge" and had an average particle size of less than 10 microns. The solvent (hexane) was then removed to yield the masterbatch. Removal can be accomplished in one of several ways including drum drying at 120° or 145° C., air drying at room temperature, or extruder drying. The masterbatch comprised 45.62 percent by weight of zinc dimethacrylate and 54.38 percent by weight of high cis polybutadiene. On the basis of 100 parts of polymer, this solution masterbatch contained 84 parts of zinc dimethacrylate.

EXAMPLE NO. 5

In this example, 13.6 kilograms of polymer cement (Example No. 2A in Table I) in hexane (20% solids) was added to a 378 liter glass reactor equipped with a thermometer, stirrer, pressure means, inlet and outlet ports and maintained under a nitrogen atmosphere. To this reactor was then added with stirring 13.6 kilograms of the zinc methacrylate as prepared in Example 3 (20% total solids in hexane). After the addition was complete, the reaction mixture was stirred at ambient temperature for an additional 20 hours. The resulting solution masterbatch was then isolated by drum drying at 115° to 120° C. The masterbatch was analyzed by TGA and shown to contain 99 parts zinc methacrylate and 100 parts polymer (theoretical would be 100 parts zinc methacrylate and 100 parts polymer).

EXAMPLE NOS. 6, 7 AND 8

Finally, in order to demonstrate the effect of solution masterbatching, according to the present invention, a comparison of three rubber stocks has been presented. For Example No. 6, a solution masterbatch (SMB) of the salt was employed, according to the present invention. In particular, 87.7 parts by weight of the solution masterbatch product of Example No. 4, containing 40 parts by weight (45.62%) of zinc dimethacrylate (ZMDA) and 47.7 parts by weight (54.38%) of high cis 1,4-polybutadiene, was combined with 52.3 parts by weight of a high cis polybutadiene rubber from Japanese Synthetic Rubber (JSR), to provide 100 total parts of rubber with 40 phr of ZMDA combined with 2 phr of the curative Dicup 40C. For Example No. 7, 40 phr of the ZMDA salt was added to 100 parts of the JSR polybutadiene rubber by dry mixing and, for Example No. 8, 40 phr of the ZMDA salt was added via the in situ technique, followed by 2 phr of the curative to each. Thus, in each of the three Examples, 40 phr of the salt was present.

Preparation of the ZMDA salt in situ was conducted for Example No. 8 by adding 100 parts of the polymer to the mixer, then 13.7 parts by weight of zinc oxide followed by 26.3 parts by weight of methacrylic acid. After mixing for 60 minutes, this mixture was then placed on a two-roll mill and the curing agent (Dicup 40C, 2 phr) was added and mixed for three minutes.

In the tables which follow, various comparisons are noted, including physical properties such as hardness, ball hardness, initial velocity, durability, and mixing and cure conditions. Cure data and physical properties reported hereinbelow are defined as follows:

JIS-C—(Japanese Industrial Standard) Comparable to ASTM Shore C
Ball Hardness—Amount of compression (in mm) of a golf ball when subjected to 100 kg strain (force). A lower number indicates a greater ball hardness.
Tb—Tensile at break (kg/cm$^2$).
Eb—Elongation at break (%).
Initial Velocity—Golf ball is struck at head speed of 45 meters/second and this is the velocity as the ball leaves the club at click.
Cure Time (T90)—This is the time to 90% total cure of the compound as measured on a curastometer from Japanese Synthetic Rubber (JSR). This instrument is comparable to a Monsanto Rheometer but is a rotorless type curometer.
Cure Time IDX—Time for temperature to reach a peak at the golf ball center during cure.
Durability of Ball—This is a test in which the ball is struck with a golf club and is equal to the number of strikes until the ball is damaged.

TABLE II

Comparison Between SMB of Zinc Dimethacrylate and Dry Mixing of Zinc Dimethacrylate

| | Ex. No. 6 | Ex. No. 7 |
|---|---|---|
| Method of Incorporation | SMB | dry mixing |
| ZMDA | 40 | 40 |
| Polymer | 100 | 100 |
| Dicup 40 C | 2 | 2 |
| Mixing Time | 6'00" | 10'00" |
| Cure time (T90) | 6.2 min | 7.7 min |

TABLE II-continued

Comparison Between SMB of Zinc Dimethacrylate and Dry Mixing of Zinc Dimethacrylate

|  | Ex. No. 6 | Ex. No. 7 |
|---|---|---|
| JIS-C Hardness | 73 | 70 |
| Tb | 216.3 | 146.6 |
| Eb | 128 | 82 |
| Durability of Ball | >400 | >200 |
| Dispersion of ZMDA[a] | Excellent | Poor |
| Initial Velocity | 72.11 | 71.73 |

[a]by visual inspection

As indicated above in Example No. 6, the solution masterbatch in Example No. 4 and the additional JSR polybutadiene rubber were mixed in a laboratory kneader for 6 minutes at 70° C. The mix was then placed on a two-roll mill and the 2 phr of Dicup 40C was added and mixed for 3 minutes. This mixture was then placed in a mold and cured at 165° C. In Example No. 7, the dried salt (40 parts of ZMDA) and the polymer (100 parts) were mixed in a laboratory kneader for 10 minutes. This mix was then placed on a two-roll mill and the 2 phr of Dicup 40C was added and mixing continued for 3 minutes. The mixture was then placed in a mold and cured at 165° C. As one can note from Table II, Example No. 6 had a shorter cure time, produced much improved dispersion, produced a harder compound and produced a golf ball which had much improved durability and initial velocity.

TABLE III

Comparison Between SMB of Zinc Dimethacrylate and in situ Addition of Zinc Dimethacrylate

|  | Ex. No. 6 | Ex. 8 |
|---|---|---|
| Method of Incorporation | SMB | in situ |
| ZMDA | 40 | 40 |
| Polymer | 100 | 100 |
| Dicup 40 C | 2 | 2 |
| Mixing Time | 6'00" | 60'00" |
| Cure time (T90) | 6.2 min | 16.6 min |
| Cure Time (Index) | 16.3 min | 21.0 min |
| JIS-C Hardness | 73 | 70 |
| Ball Hardness | 2.46 | 2.88 |
| Initial Velocity | 72.11 | 69.52 |

In Table III, Example No. 8 was mixed as indicated hereinabove. The mixtures were placed in a mold and cured at 165° C. Again, the results show that Example No. 6 cured in a shorter time and produced a harder compound and ball which had greater initial velocity.

In conclusion, it should be clear from the foregoing examples and specification disclosure that the addition of metal salts of α,β-ethylenically unsaturated carboxylic acids, particularly zinc dimethacrylate to rubbery polymers, such as high cis polybutadiene, via solution masterbatch, results in better dispersion and better processability of the rubber compound, reduced curing times, and greater ball hardness, durability and higher initial velocity for golf balls produced therefrom, as compared to golf balls prepared from rubber compounds to which metal salts have been added by dry mixing and in situ techniques. It is to be understood that the invention is not limited to the zinc dimethacrylate and high cis polybutadiene exemplified herein or by the disclosure of other metal salts and typical rubber polymers provided herein, the examples having been provided merely to demonstrate practice of the subject invention. Those skilled in the art may readily select other metal salts and/or rubbery polymers, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. A method for the production of solid golf balls, comprising the steps of:
    preparing a polymer cement in a suitable aliphatic hydrocarbon solvent;
    forming a suspension of a metal salt of an α,β-ethylenically unsaturated carboxylic acid in a hydrocarbon solvent miscible with said aliphatic hydrocarbon solvent;
    mixing said polymer cement solution and said suspension together;
    removing said solvents to provide said metal salt uniformly dispersed within said polymer; and thereafter
    manufacturing said solid golf ball therefrom.

2. The method of claim 1, wherein said step of preparing said polymer cement includes the step of polymerizing a vulcanizable rubber monomer selected from the group consisting of natural rubber, synthetic rubber monomers and blends thereof.

3. The method of claim 2, wherein said step of forming includes the step of selecting a metal salt formed by the reaction of a metal selected from the group consisting of zinc, iron (II), copper (II) and the alkaline earth metals and an α,β-ethylenically unsaturated carboxylic acid having from 3 to about 30 carbon atoms.

4. The method of claim 3, wherein said metal is zinc.

5. The method of claim 4, wherein said salt comprises zinc dimethacrylate.

6. The method of claim 5, wherein 5 to 100 parts by weight of said salt are utilized per 100 parts of said vulcanizable rubber.

7. The method of claim 6, wherein 10 to 70 parts by weight of said salt are utilized per 100 parts of said vulcanizable rubber.

8. The method of claim 7, wherein 20 to 60 parts by weight of said salt are utilized per 100 parts of said vulcanizable rubber.

9. The method of claim 8, wherein 40 parts by weight of said salt are utilized per 100 parts of said vulcanizable rubber.

10. The method of claim 9, wherein said vulcanizable rubber comprises cis 1,4-polybutadiene.

11. The method of claim 2, wherein 10 to 70 parts by weight of said salt are utilized per 100 parts of said vulcanizable rubber.

12. The method of claim 11, wherein 20 to 60 parts by weight of said salt are utilized per 100 parts of said vulcanizable rubber.

13. The method of claim 12, wherein 40 parts by weight of said salt are utilized per 100 parts of said vulcanizable rubber.

14. The method of claim 13, wherein said polymer comprises cis 1,4-polybutadiene.

* * * * *